UNITED STATES PATENT OFFICE.

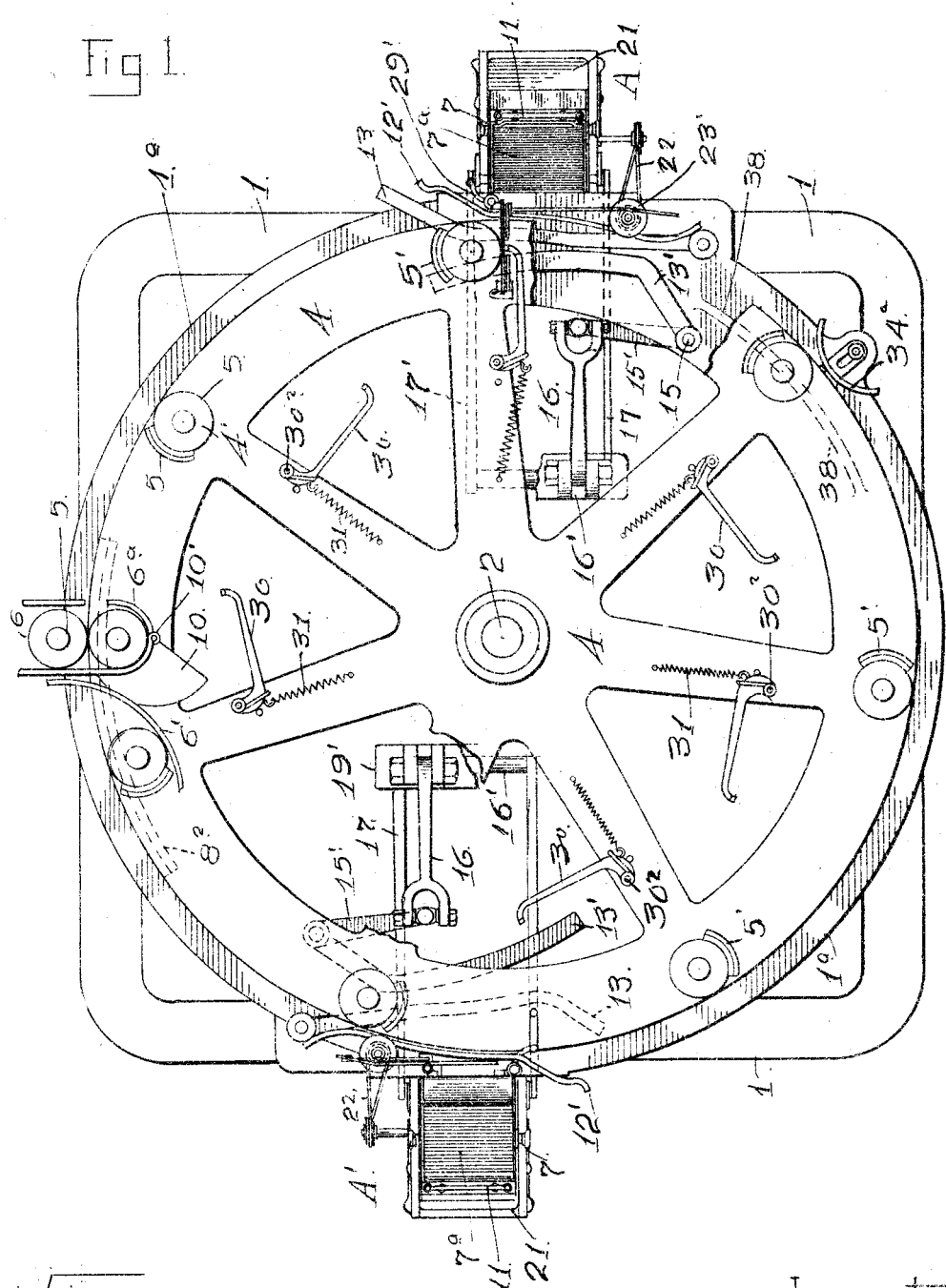

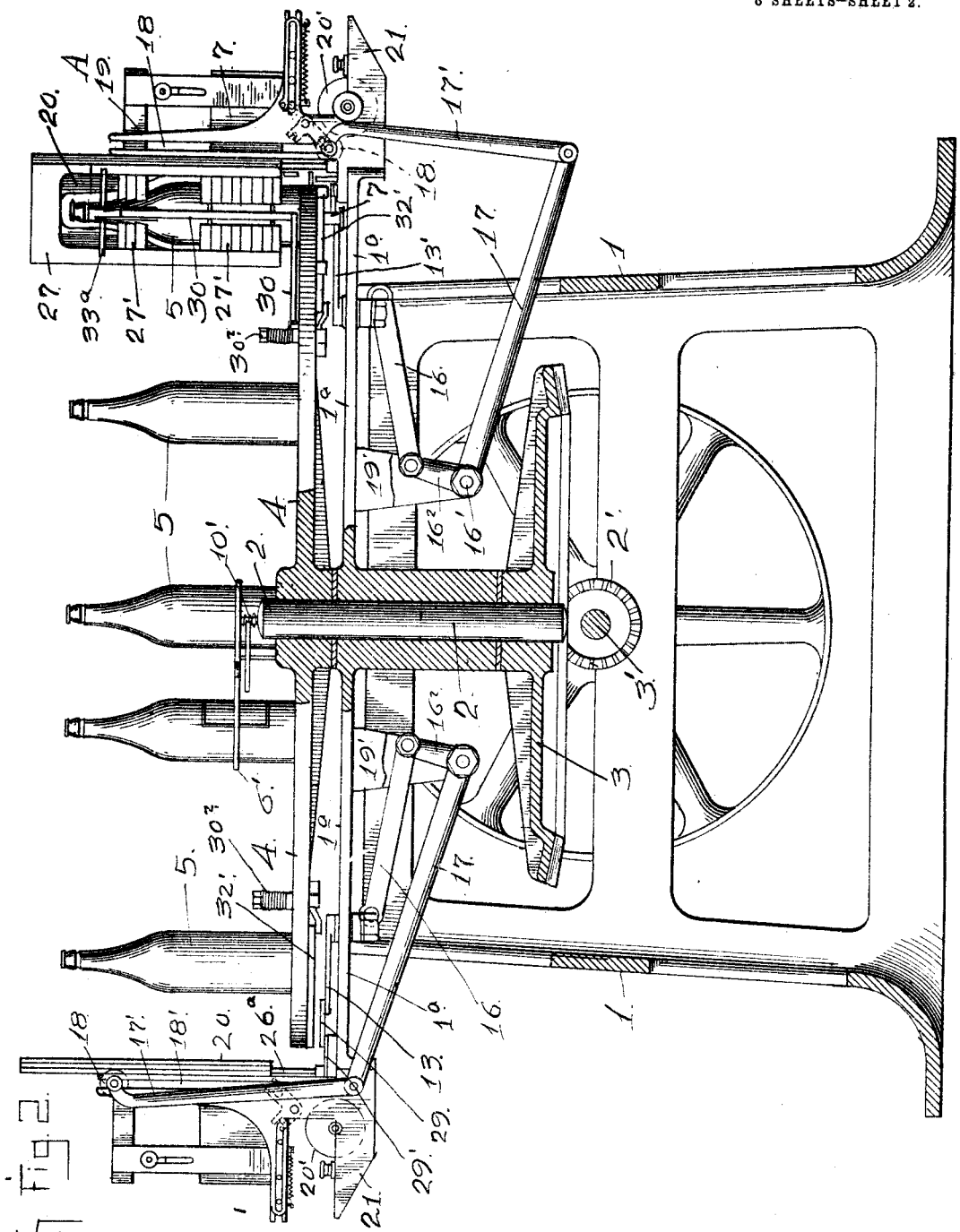

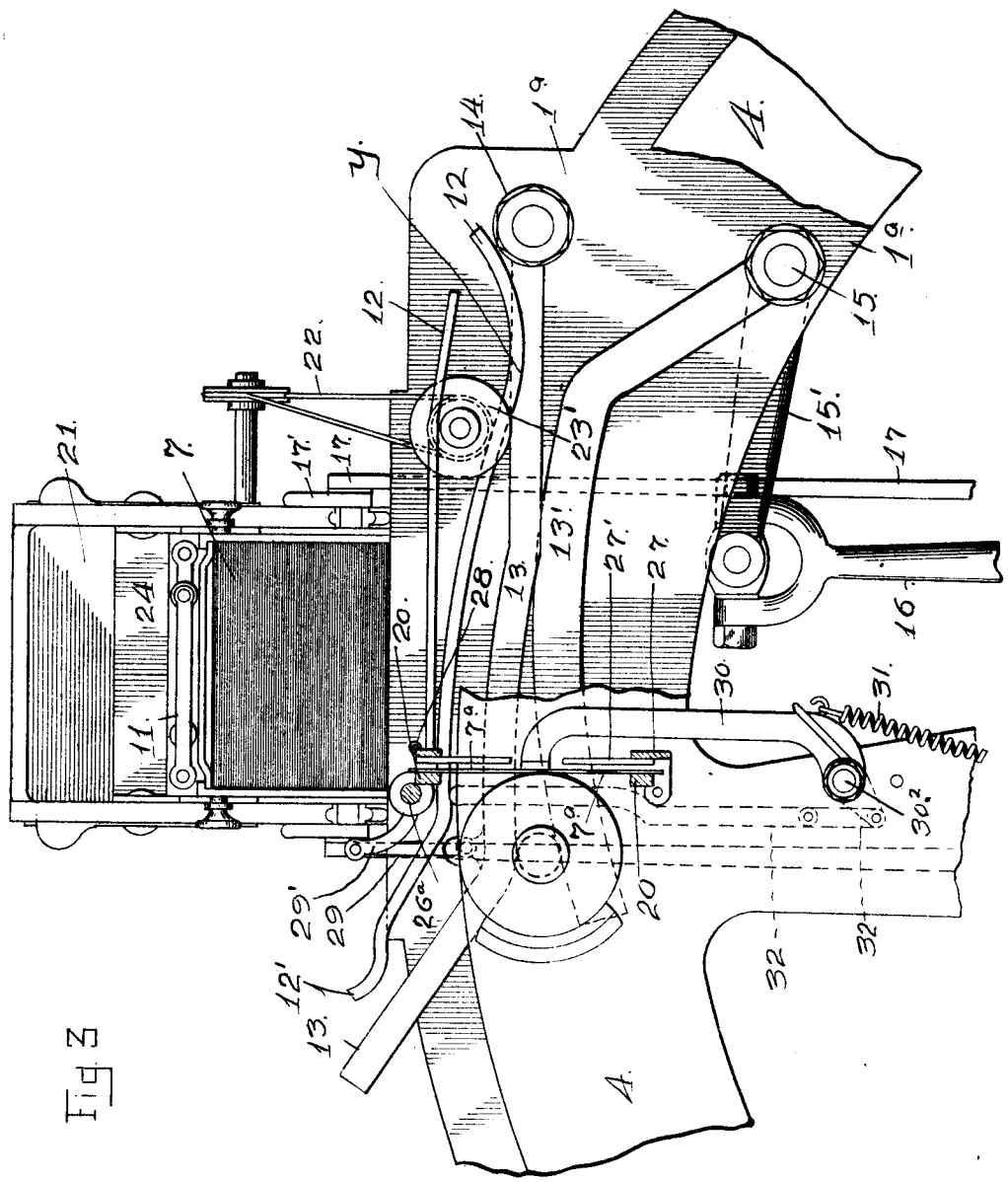

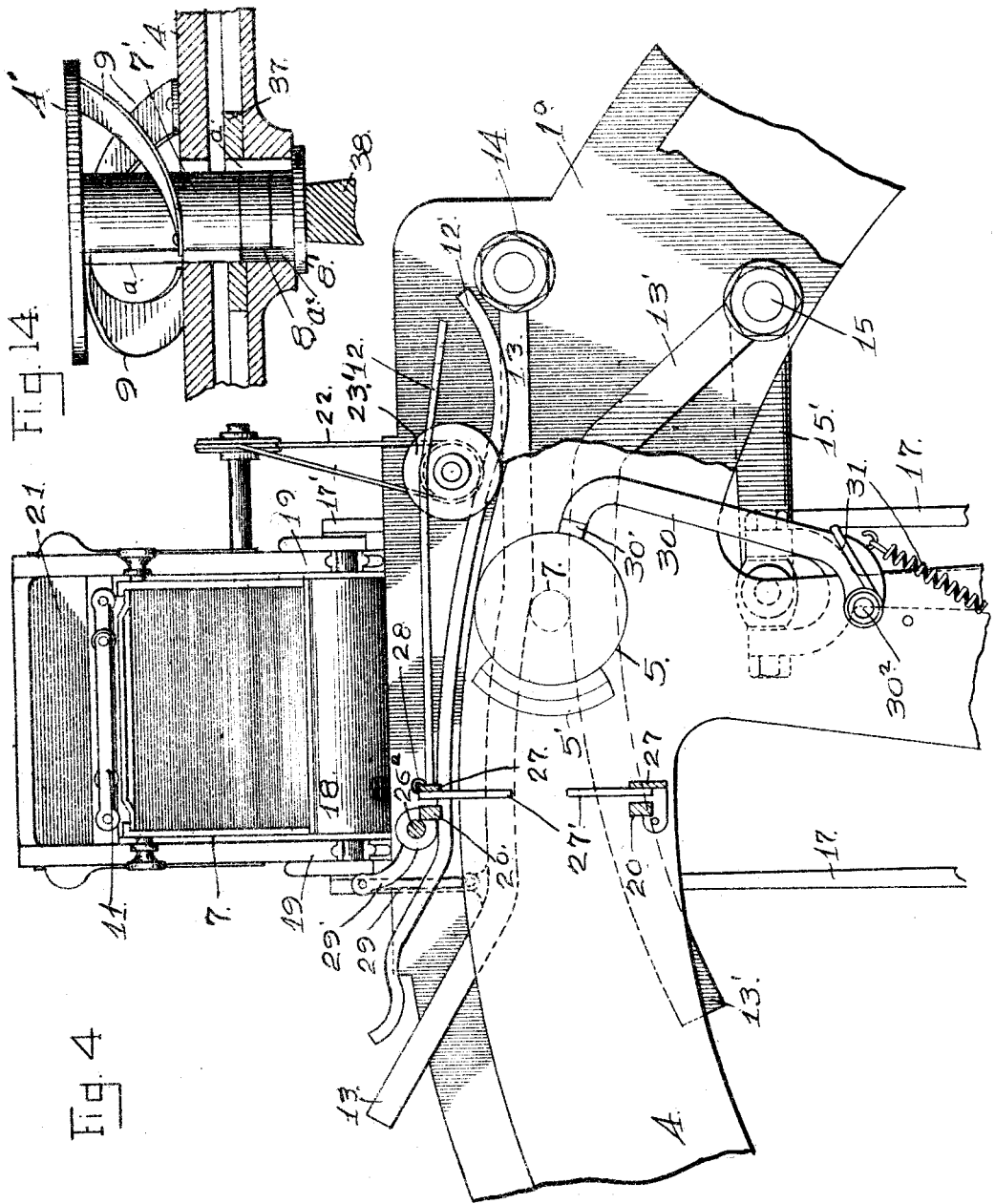

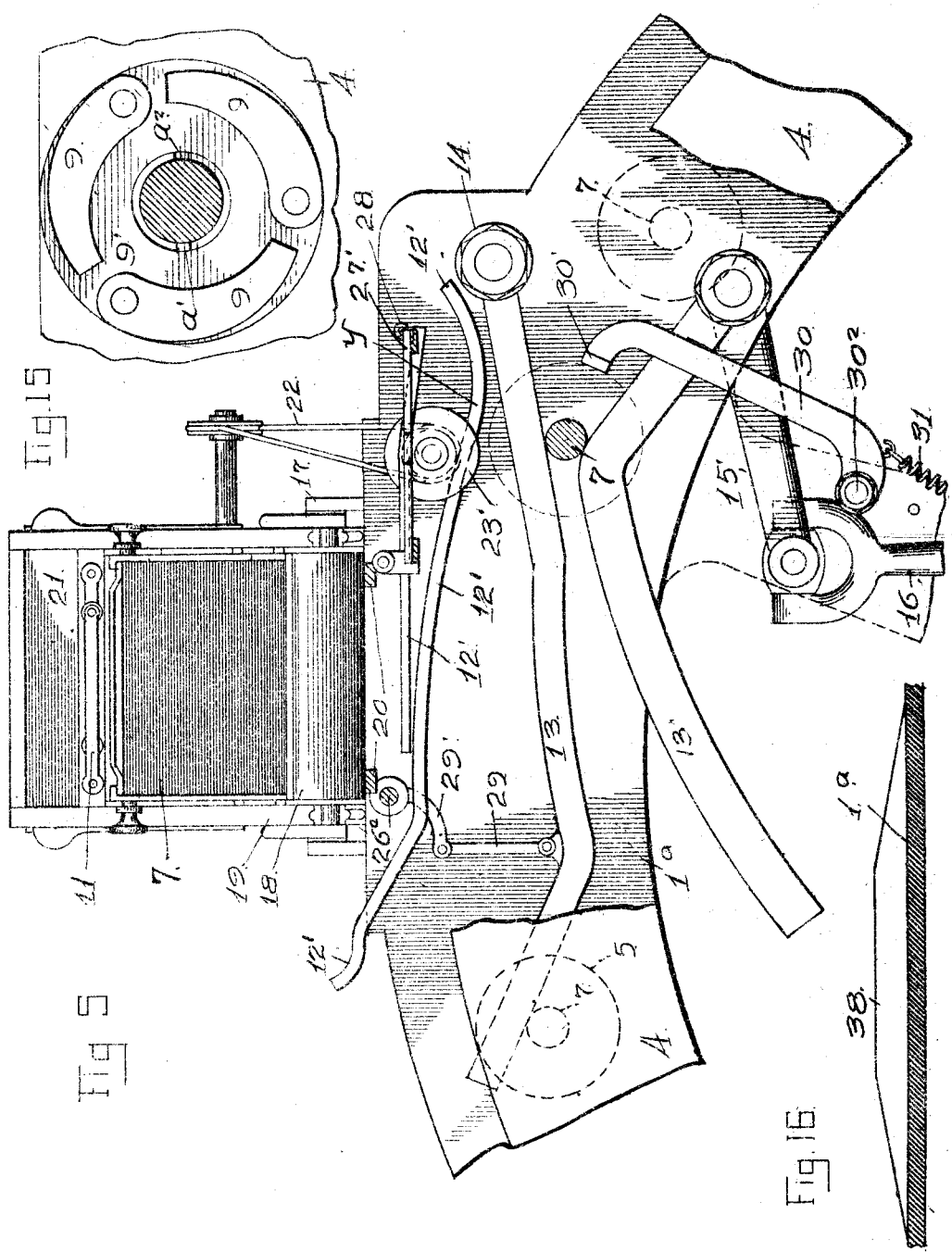

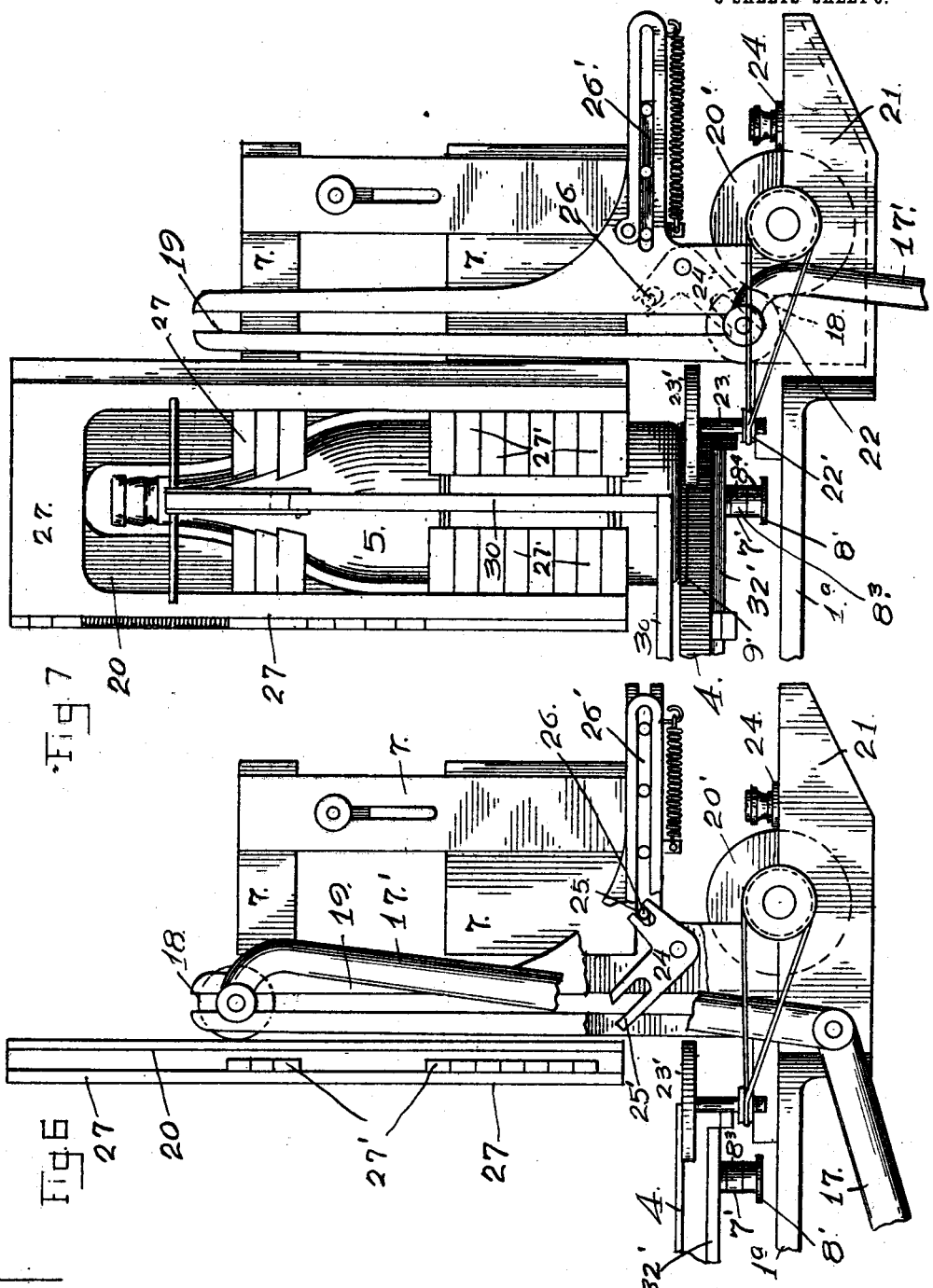

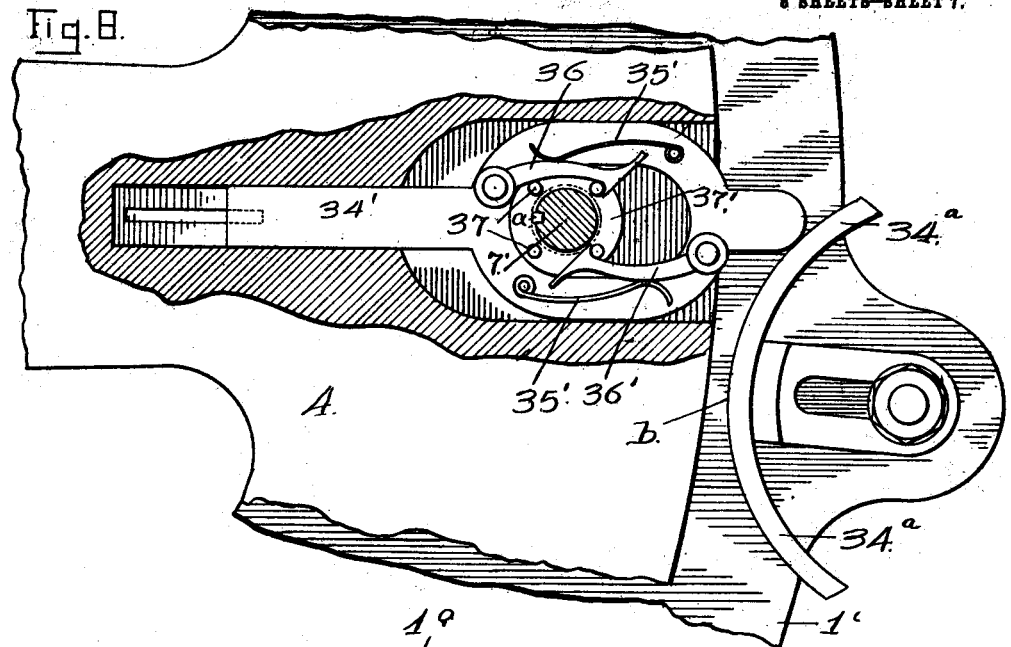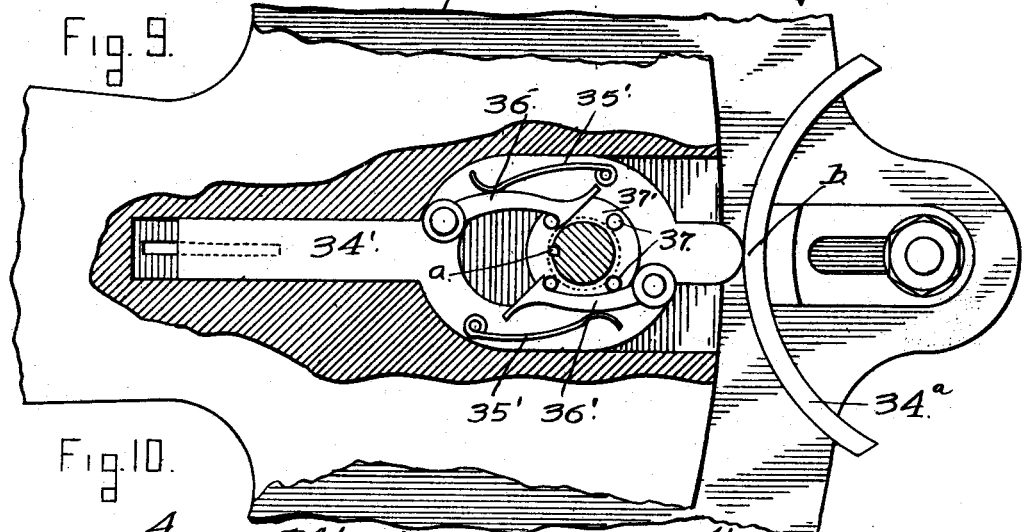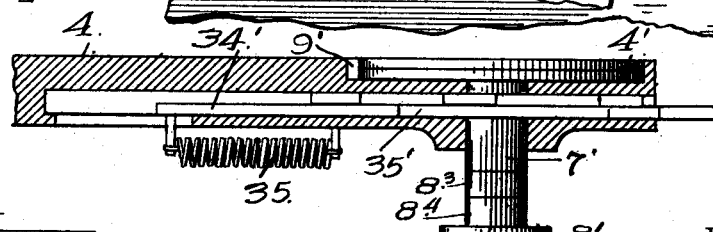

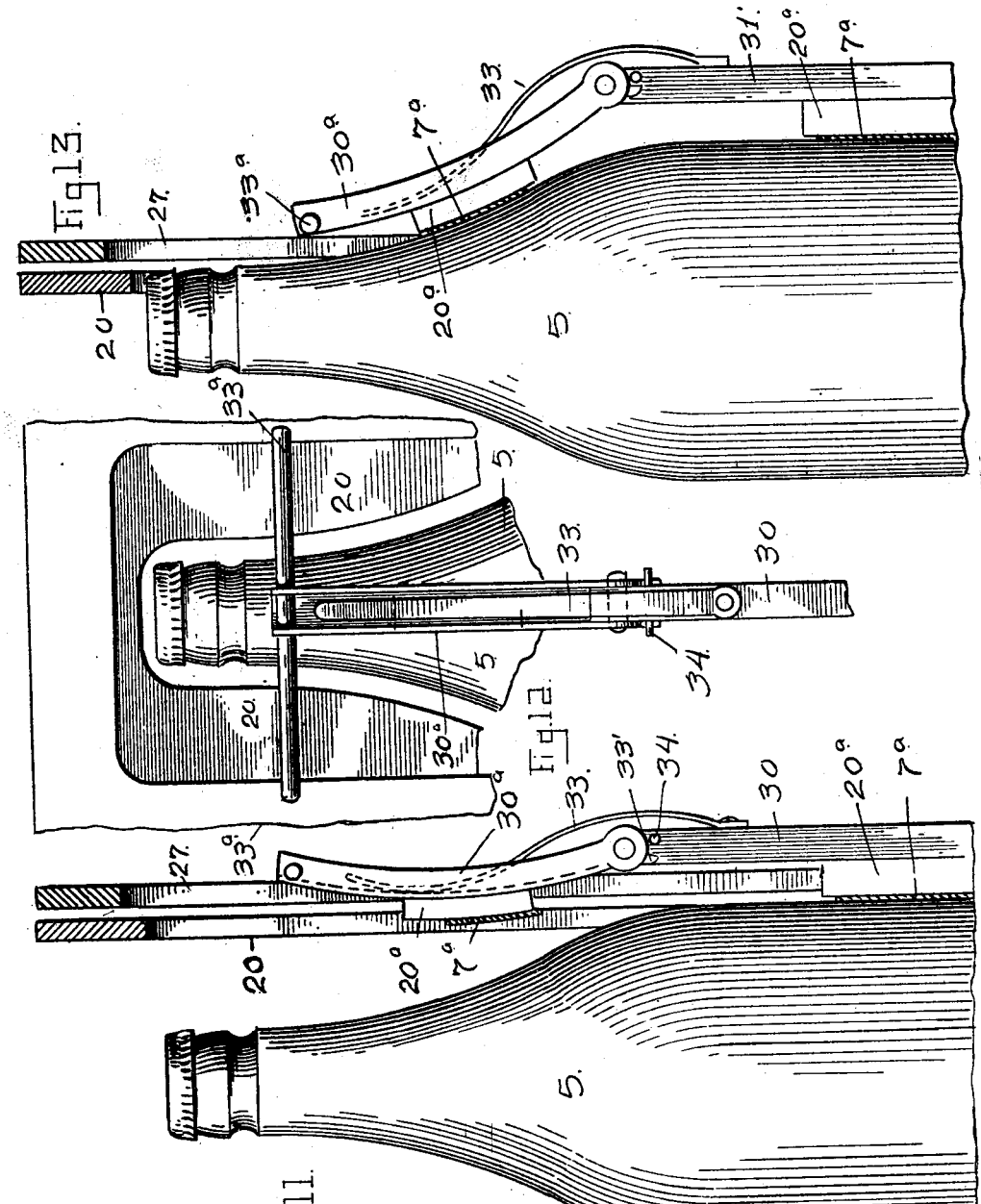

GEORGE LEE BENDER AND JOHN GEORGE RAPP, OF SAN FRANCISCO, CALIFORNIA.

LABEL-APPLYING APPARATUS.

1,071,135.

Specification of Letters Patent. Patented Aug. 26, 1913.

Application filed January 6, 1912. Serial No. 669,786.

*To all whom it may concern:*

Be it known that we, GEORGE LEE BENDER and JOHN GEORGE RAPP, citizens of the United States, residing in the city and county of San Francisco and State of California, have invented certain new and useful Improvements in Label-Applying Apparatus, of which the following is a specification.

The hereinafter described invention relates to an improved apparatus for applying labels to filled bottles, although its use is not restricted to the labeling of bottles, and the same comprises a rotatable table provided with a series of spring held holders for sustaining the bottles delivered thereto at a feed station, either automatically or by hand, means for placing the label or labels to be applied within the path of the propelled bottles, devices for applying paste to the surface of the label, a positioning device for each bottle holder for holding the label to the surface of the bottle while being applied thereto, wipers for smoothing out the label and pressing the same to the surface of the bottle, a label container, and mechanism for applying paste to the surface of the swinging frame or holder for removing the labels successively from the container and placing the same within the path of the propelled package.

The construction of the co-acting working parts is such that the paste applying mechanism and the swinging frame for placing the label within the path of a propelled bottle, are not thrown into action unless a bottle is positioned on the holder, carried toward the labeling mechanism; hence in operation of the apparatus if a bottle is not conveyed past the labeling mechanism, the said mechanism and the interworking parts thereof are not thrown into action, consequently, no bottle, no label feed.

The hereinafter described apparatus is designed for the applying of a label to two sides of the bottle, and for this purpose preference is given to the employment of duplicate paste and label applying mechanism, located at diametrically opposite points of the rotary table containing the holders for the bottles to be labeled, there being interposed between such labeling stations a device for actuating a suitable lever for partly rotating each bottle holder in order to impart thereto a one-half turn or rotation to present a fresh surface or face of the bottle to the second set of label applying mechanism.

The object of the invention is to render automatically the work of applying labels to filled bottles, to materially expedite the work of labeling the bottles and by so doing increasing the output of the labeling plant and correspondingly reducing the cost of labeling the bottles, and to provide against the feeding of labels in case no bottle is presented for labeling, thereby providing against the waste of material and delay in the operation of the apparatus.

To comprehend the invention reference should be had to the accompanying sheets of drawings illustrating a simple constructed apparatus for successively carrying out the invention, wherein—

Figure 1 is a plan view of the apparatus disclosing a single feed station, a duplicate set of mechanism for applying labels and placing the same within the path of a traveling bottle, the rotary table provided with a series of can holders being partly broken away in order to illustrate the levers for operating the paste applying rollers and the swinging frame for removing the label from the label container and positioning the same within the pathway of a bottle, also the frame carrying the label wipers which works in unison with the said swinging frame, one of which swinging frames and its associated wiper frames being illustrated in position for applying a label to a bottle, the bottle being shown positioned immediately in advance thereof, said view disclosing the positioning devices for holding the label onto the surface of the bottle until carried beyond the wipers, there being a positioning device for each of the bottle holders. Fig. 2 is a part sectional view in elevation of the mechanism disclosed by Fig. 1 of the drawings, illustrating a series of bottles within the holders of the rotary carrier or table, one of the bottles being positioned immediately in advance of the positioned swinging label holding frame and the wipers of one of the label applying mechanism, said view disclosing, one of the paste applying rolls in raised position and one in a lowered position, and the position of the respective levers for actuating same. Fig. 3 is a detail broken plan view disclosing the arrangement of the levers for operating the vertically movable paste applying roll and for throwing the swinging label carrying frame and the frame containing the label wipers carried thereby, likewise the positioning device for holding the label to the surface of the bottle as carried past the label wipers, said view illustrating the swinging label carrying frame with a label held thereto, and the wiper frame hinged thereto positioned within the path of a propelled bottle, the bottle as positioned against the surface of the label to which paste is applied, and the positioning device as bearing against the held label for holding the same onto the surface of the bottle. Fig. 4 is a view similar to Fig. 3 of the drawings, illustrating the position of the bottle and the label positioning device or arm after having been carried beyond the wipers for the label. Fig. 5 is a similar view illustrating the position of the operating levers for the paste applying roll and the swinging label frame carrier, after the said carrier has been returned to its normal position or swung inwardly against the forward end of the label container, the position of the hinged frame for the label wipers being illustrated. Fig. 6 is a broken detail side elevation of the parts positioned as illustrated in Fig. 5 of the drawings, the paste feed roll for applying paste to the swinging label frame carrier being disclosed in raised position. Fig. 7 is a similar view of the parts positioned as illustrated in Fig. 3 of the drawings, the paste feed roll being disclosed in lowered position. Fig. 8 is an enlarged detail broken plan view of the rotatable table, illustrating the means for imparting a part rotation to the bottle as conveyed from one labeling station to the other labeling station for exposing an unlabeled surface of the bottle for having a label applied thereto, the operating slide for said means being illustrated as having just engaged with the inwardly inclined portion of the segmental cam on the frame of the machine for actuating the said slide. Fig. 9 is a similar view illustrating an advanced position of the operating slide and the position of the pawls carried thereby which engage with the teeth or studs upwardly projecting from the rotatable collar normally loose on the stem of the holder or supporting disks for the bottles to be labeled. Fig. 10 is a vertical central sectional view of Fig. 8 of the drawings. Fig. 11 is a broken detail sectional view of the label carrier and label wiper with a bottle to be labeled positioned just prior to its engagement with the inner surface of the label, disclosing the position of the label positioning lever or arm. Fig. 12 is a broken detail side elevation of the parts disclosed by Fig. 11 of the drawings. Fig. 13 is a view similar to Fig. 11 of the drawings, illustrating the position of the bottle when in engagement with the held label. Fig. 14 (Sheet 4 of the drawings) is an enlarged detail part sectional view of the support or holder for the bottle to be labeled, disclosing the springs for maintaining the said support in raised position when relieved of the weight of a filled bottle. Fig. 15 (Sheet 5 of the drawings) is a plan view of the parts disclosed by Fig. 14 of the drawings, the supporting disk or holder for the bottle being removed. Fig. 16 is a detail view of the cam track for raising the bottle holders to release the stem thereof for permitting a part rotation of the holders as the bottles are conveyed from one labeling station to the other.

In the drawings, referring more particularly to Figs. 1, 2 and 14 thereof, the numeral 1 is used to designate any suitable form of a supporting frame capable of sustaining the working parts of the apparatus, 2 is a vertically disposed shaft extended through said frame, carrying at its lower end a drive gear wheel 3, which is driven by means of a pinion 2' secured to a drive shaft 3' meshing therewith. On the upper end of the vertically disposed shaft 2 is mounted a spider 4, the rim of which carries a series of circumferentially disposed supporting plates or holders 4' for the bottles 5 to be labeled. Each of said supporting holders is provided with an upwardly projecting segmental wall 5', which serves to prevent the displacement of the bottles after they are delivered onto the said supporting holder. The bottles to be labeled are delivered onto the supporting holders during the rotary movement of the spider 4 which shall hereinafter be referred to as a table, by the feed runway 6, the labeled bottles being removed or deflected therefrom at a suitable delivery station by the fixed deflector plate 6', arranged a slight distance above the rotary table and within the path of the propelled labeled bottles. For convenience and to obtain an increased capacity for the apparatus there are two labeling stations A and A', the same being situated at substantially diametrically opposite points with respect to the rotary table 4, and each station is provided with a label holding container 7. The mechanism for removing the labels from the containers, applying paste thereto, placing the label transversely within the path of the propelled bottles, the device for holding the label positioned against the surface of the bottle, wiping the label thereon, and for throwing into action the working instrumentalities for actuating said parts are identical at each labeling station, hence the description of one of said mechanisms will answer for the other and the same reference numerals being applied to the working parts of each, the mechanism situated at station A, Fig. 1 of the drawings, is more particularly referred to in following the description and working of the apparatus.

Each supporting holder 4' for the bottle 5 is secured to the upper end of a short stem 7', which extends through a suitable vertical bore 8 in the rim of the table 4, Figs. 2, 5, 6, 7 and 14 of the drawings, being held to the table by means of the enlarged head 8' thereof, which, when the stem 7' is raised its full distance, bears against the under face of the rim of the table 4, Fig. 14 of the drawings. Each of the bottle supporting holders 4' is normally held upward a slight distance above the surface of the table 4 by the pressure of the light sustaining springs 9, the tension of which is sufficient to overcome the weight of the platform or holder 4' and its supporting stud 7', and raise the holders from within the seats 9', formed in the upper surface of the rim of the table 4, Fig. 7 of the drawings. On a filled bottle being delivered from the feed runway 6 onto one of the supporting holders 4', the weight thereof overcomes the pressure of the springs 9 and causes a lowering of the holder 4' until the same rests within its seat 9', Figs. 7 and 10 of the drawings, which places the lower end of the stud 7' a distance below the rotary table 4 and in the path of the actuating levers for the hereinafter described labeling mechanism.

The bottles 5 to be labeled are placed vertically within any sort of a suitable inclined feed runway 6, being held therein by means of the lower curved end, which is provided with a hinged outwardly opening section 6ª, to which is connected an inwardly movable guard shield or blade 10, Fig. 1 of the drawings, the lowermost bottle of the series of bottles being supported within the feed runway by the rim of the rotatable table 4 working beneath the feed runway 6. As the supporting platforms or holders 4' are carried successively beneath the lower end of the feed runway, the segmental wall 5' thereof bears against the face of the lowermost bottle 5 and gradually removes the same from within the runway, the pressure against the hinged section 6ª thereof causing the same to swing outwardly to give clearance for the removal of the bottle, while at the same time the guard shield or blade 10 is thrown inwardly by the outward movement of the section 6ª to hold the second bottle of the series against movement until the foremost bottle has been removed, when the pressure of the coiled spring 10' exerts itself and restores the hinged section 6ª and itself and guard shield or blade 10 to normal position, thereby releasing the series of retained bottles and placing the lowermost bottle of the same in position to be removed by the next of the series of bottle holders 4' carried by the rotary table 4, it being understood that they successively remove the bottles from within the feed runway one at a time. The weight of a removed bottle falling onto the supporting holder 4' holds the same into its seat 9', placing the lower end of its stem 7' in the path of the actuating levers for the labeling mechanism.

In order that the bottle holders 4' may not move upwardly from within the seats 9' as they are carried toward the feed runway, there is provided adjacent the delivery station a segmental track 8², which is extended a short distance beyond the feed runway 6, Fig. 1 of the drawings. As the holders approach the delivery station, the enlarged head 8' of the stem 7' moves beneath the segmental track 8² preventing the holders 4' from moving upwardly within their seats 9', and holding the same in a plane with the upper surface of the rim of the rotatable table 4, so that the holders 4' will move beneath the bottle to be labeled as the holders are carried past the feed runway 6.

In each container 7 the labels 7ª are arranged edgewise, the same being held forwardly pressed by a spring held follower 11 therein, Figs. 1, 3, 4 and 5 of the drawings. By reference to these figures of the drawings, likewise, Figs. 6 and 7, the working of the actuating parts for the label applying mechanism will be understood. It will be noted that to the frame of the machine in advance of each label container is secured a fixed cam plate 12 and below the rotary table 4, a fixed cam plate 12', and a plurality of pivoted cam levers 13 and 13', the lever 13 being secured to the upper surface of the top plate 1ª of the frame 1 being normally held inwardly pressed by the coiled spring 14, and said cam lever is in a plane slightly above that of the cam lever 13'. The inner end of the cam lever 13' is secured to a short vertical post 15 extended through the top plate 1ª and to the lower end of said post is connected a lever 15', which in turn by a link 16, is connected to a crank 16² which is connected to a rock shaft 16', to which shaft is connected at their inner ends the forwardly extended lever arms 17. At their outer ends the said lever arms 17 are pivoted to the lower ends of the vertically extended arms 17'. Figs. 1, 2 and 7 of the drawings, and each at its upper ends is connected to one of the trunnions of a paste applying roll 18, working within vertical ways 18' of an open frame 19 arranged in advance of the label container 7. This roll 18 is normally held down by the weight of itself and the interconnected parts 17 and 17', the rock shaft 16' to which the parts 17 are attached being supported by a hanger 19' suspended from the under face of the top 1ª of the frame 1, and the purpose of the roll 18 is to apply paste to the side faces of an open swinging label carrying frame 20, Figs. 3, 4 and 5 of the drawings, on the upward movement of the said roll within the guide ways 18' of the fixed frame 19. The roll 18 receives paste from a paste feed roll 20' working within a paste receptacle or reservoir 21 and in frictional contact with the roll 18 when in its full lowered position, Fig. 7 of the drawings. The paste feed roll 20' is driven by a belt 22 working over a roll 22' on the lower end of a stud 23, to the upper end of which is secured a frictionally driven roll 23'. The periphery of this roll bears onto the rim surface of the rotatable table 4, so that as said table is rotated the frictional contact of the roll 23' therewith causes rotation to be imparted thereto, which in turn is transmitted by the belt 22 to the paste applying roll 20'.

To prevent an excess of paste being applied to the paste applying roll 18, a scraper blade 24 is arranged transversely of the paste receptacle 21 to bear onto the surface of the roll 20', so that only a thin film of paste is carried to the surface of the paste applying roll 18.

Within the frame 19, at each side thereof is pivoted a bell crank 24, Figs. 6 and 7 of the drawings, the arms of which are notched as shown at 25 and 25', for engaging respectively the pins 26 projecting laterally from the reciprocating slide 26' to which the label containers 7 are secured, and the trunnions of the paste applying roll 18. As the said roll approaches the limit of its downward stroke the trunnions thereof enter into the notched portion 25' of the forward arms of the bell cranks 24 and throw the said arms downwardly; causing the opposing arms to swing forwardly and through the engagement of the notched portion 25' thereof with the projections 26 of the slide 26' carrying therewith the label containers 7 in order to place the first label of the series of labels 27 held therein against the exposed surface of the swinging frame 20, to which the paste has been applied. During a portion of its upper stroke for the applying of paste to the exposed surface of the said frame 20, the trunnions of the paste applying roll 18 are in engagement with the notched portion 25' of the bell cranks 24, which raises such arms of the bell cranks and causes a reverse movement to be imparted thereto, throwing inwardly the opposing arms thereof to move the slide 26' inwardly to take the held stack of labels away from possible contact with the paste applying roll. It will thus be seen that the movement of the roll 18 not only applies paste to the surface of the swinging label carrying frame, but likewise controls the action of the label containers.

The open label carrying frame 20 is hinged to a post $26^2$ upwardly projecting from the frame of the machine at one side of the label receptacle 7, and to the free edge of said frame is hinged a frame 27, carrying the label wipers 27' preferably composed of rubber strips which serve as fingers for wiping and smoothing out the label. To the lower free edge of the frame 27 is attached a depending roll 28, which roll rides on the face of the fixed cam plate 12 as the frame 20 is swung in and out, the said cam plate 12 serving as a track for guiding the frame 27 in its movements with the swinging frame 20. The movement of the swinging frame 20 is controlled by the action of the pivoted cam lever 13, which at its outer end portion is connected by a link 29 to a short lever 29' projecting from the hinged side of the frame 20, Figs. 3, 4 and 5 of the drawings. As the pivoted cam lever 13 is forced outwardly, the connections 29 and 29' actuated thereby swing the frame 20 inwardly to assume a position transverse of the rotatable table 4, the frame 27 swinging therewith and folding thereon, Figs. 1, 2, 3, 4, and 7 of the drawings, being guided in its movement by the roll 28 depending therefrom riding on the outer face of the fixed guide track 12. On the inward movement of the cam lever 13, due to the pressure of the coiled spring 14, an opposite throw is imparted to the described parts, causing the frame 20 and the wiper frame 27 to assume a horizontal position, with the frame 20 positioned in advance of the label receptacle 7—Figs. 5 and 6 of the drawings, the swinging label carrying frame 20 being thus positioned for receiving paste from the roll 18 when moved upwardly within the frame 19.

For each bottle holder there is provided a swinging arm 30, provided at its outer end with an upwardly projecting extension 30' which extension of the said arm on the same being swung inwardly bears onto the central section of the label held within the frame 20 and presses the same against the surface of the bottle for holding the label properly positioned thereon as subjected to the action of the wipers. These arms 30, hereinafter termed positioning arms, are each secured to a rotatable post $30^2$ extended through the table, and are normally held inwardly pressed by the tension of the springs 31, connecting the same to the rotatable table 4, Figs. 1 and 3 of the drawings. Below the table 4, each of the posts $30^2$ is connected by a crank arm 32 to a slide rod 32', the outer end of which rod normally projects a slight distance beyond the table 4, and during the rotary movement of the table, as the bottle holder with the positioning arm associated therewith approaches the labeling mechanism, the outer end of the slide rod 32' rides upon the fixed inclined cam plate 12' and as carried thereover is forced inwardly, actuating the crank arm 32 to rotate the post $30^2$, for swinging outwardly the arm 30 to place its upward extension 30' thereof in a position immediately back of the label 7ª held to the swinging label carrying frame 20, Figs. 3, 5, 7, 11 and 12 of the drawings, in which position the arm 30 remains until the bottle to be labeled is carried beyond the labeling mechanism, when the spring 31 gradually restores the said arm to normal position, Fig. 1 of the drawings.

Inasmuch as the present apparatus is designed to apply a label to the neck of the bottle, as well as to the body portion thereof, it is necessary that the upper end of the extension 30' be arranged to conform to the shape of the neck portion of the bottle, and for this purpose the said arm extension 30' is provided with a hinged section 30ª, held inwardly pressed by the tension of a flat spring 33, Figs. 11, 12 and 13 of the drawings. The inward movement of the hinged section 30ª is limited by a stud 33', which engages with a lug 34 projecting from the side of the extension 30'. To prevent the pressure of the hinged section bearing with full force against the upper label 7ª for the neck of the bottle, which would tend to force the small label from the swinging label carrying frame 20, the same carries at its upper end a cross piece 33ª, which when the positioning arm is swung outwardly its full distance bears against the face of the frame 27 for the label wipers 27', Figs. 7 and 12 of the drawings.

As the bottle is carried past the first labeling station, it is required, where a label is to be applied to the surface of the bottle opposing that to which a label has been applied, that the bottle be given a one-half rotation. For this purpose there is secured to the frame at a suitable point intermediate the labeling stations an adjustable fixed cam plate 34, Figs. 1, 8 and 9 of the drawings. Within a slotted section in the under face of the rim of the table 4, beneath each bottle holder 4', works a slide plate 34', normally held outwardly pressed by a spring 35 so as to cause its outer end to project a slight distance beyond the periphery of the table 4. This plate is slotted at its forward end so as to straddle the vertically movable stem 7' for the holder 4', Figs. 8, 9, 10 and 14 of the drawings, and to the upper face of the said slide 34' two dogs 36 and 36' are pivoted, held inwardly pressed by the springs 35'. The tooth of each dog engages with one of the short pins 37 upwardly projecting from a collar 37' through which the stem 7' of the holder 4' extends, the said stem having loosely mounted thereon above the head 8' the rolls 8³ and 8⁴, Figs. 10 and 14 of the drawings. Each stem 7' is formed with a key a, which extends to within a short distance of its lower end and when the holder 4' is lowered its full distance fits within one of the key seats a' and a² formed in the opposing faces of the lower portion of the vertical bores in the rim of the table 4, Figs. 14 and 15 of the drawings, through which the stems 7' of the holders 4' work, and in order to prevent rotation of the holders 4', the said key passes through a key seat in the collar 37' to hold the same locked thereto. As each bottle 5 seated on the holders 4' is carried by the rotatable table with a label applied to one face thereof toward the cam plate 34ª, the enlarged head or lower end 8' of the stem 7' of each holder 4' rides or moves onto the upwardly inclined track 38 secured to the frame of the machine in the path of the stems 7', Fig. 1 of the drawings, which gradually lifting the stem 7' until the key a thereof is raised from within one of its key seats, say, a', by which time the projecting end of the slide 34' will have moved onto the inwardly inclined portion of the cam plate 34ª and moves thereover until its highest point b of incline is reached, gradually forcing inwardly the said slide, causing the dog 36 carried therewith in locked engagement with one of the projecting pins 37 to impart a part rotation or one-quarter turn to the collar 37', Figs. 8 and 9 of the drawings, and as the stem 7' is keyed thereto rotating the holder 4' with a labeled bottle thereon. As the outer end of the slide plate 34' is carried beyond the point b of the cam plate 34ª the same rides on the outwardly inclined portion thereof, being gradually forced outwardly by the tension of the spring 35. With this movement of the slide plate 34' the dog 36' carried thereby in locked engagement with one of the teeth or pins 37 of the collar 37' imparts a part rotation or one-quarter turn to the same and the stem 7' of the holder 4', placing the key a of the stem 7' in registry with the key seat a², opposite the seat a'. By this time the lower end of the stem 7' will have been carried beyond the sphere of the raised cam 38, when the weight of the labeled bottle resting on the holder 4' will force the same downward its full distance, the movement of the rotary table conveying the labeled bottle toward the second labeling station with an unlabeled surface exposed for receiving a label as the bottle is carried past the labeling mechanism situated at said station.

The action of the various parts will be understood by the following description as to the working of the apparatus. As a bottle 5 to be labeled is received onto a depressed holder 4' of the rotary table 4, the weight thereof maintains the holder in its lowered position after the head 8' of the stem 7' has moved beyond the segmental track 8². With the bottle thus positioned and supported in place by the segmental wall 5' upwardly projecting from the holder 4', the same is conveyed by the movement of the table 4 toward the labeling mechanism situated at station A, the positioning of the parts thereof being as disclosed by Fig. 5 of the drawings. As the roll $8^3$ of the stem 7' of the holder 4' moves onto the inclined portion of the pivoted cam lever 13, it forces the same outwardly, which, through its connections 29 and 29' partly rotates the post $26^a$ for swinging the label carrying frame 20 with a label adhering thereto and the wiper frame 27 hinged to the free edge thereof into a position transverse of the path of the bottle 5 to be labeled, Fig. 3 of the drawings. During the movement of the roll $8^3$ over the incline portion of the cam lever 13, the projecting end of the slide rod 32' is carried over the incline portion of the fixed cam 12', which forces inwardly the said slide rod and through its connection with the arm 30 throwing the same inwardly to place its extension 30' immediately back of the label $7^a$ held to the frame 20, the rubber pads $20^a$ carried by said extension and its hinged section $30^a$ resting against the central portion of the labels to be applied to the body and neck portions of the bottle 5. The position of the parts when thus thrown will be understood by reference to Figs. 1, 2, 3 and 11 of the drawings. The bottle as advanced and carried through the open frame 20 bears against the inner face of the label, which is held thereto by the pressure of the upwardly extending portion of the swinging arm 30, and removes the label from the said frame, the wiper fingers 27' pressing the labels to the surface of the bottle and smoothing out the same as the bottle is carried through the open frame 27 and the wiper fingers—Fig. 7 of the drawings. By the time the bottle has passed through the frames 20 and 27, the roll $8^4$ bears onto the lever arm 13' gradually forcing the same inwardly, Figs. 4 and 5 of the drawings, the cam lever 13 being gradually restored to normal position by the tension of the spring 14' for swinging the frames 20 and 27 into position to place the frame 20 in front of the label holding receptacles 7. With the inward movement of the arm 13' rotation is imparted to the stud or post 15, which, through its connections with the levers 17, Figs. 2, 3, 4 and 5, raises the arms 17' to force upwardly the paste applying roll 18, which, during its upward movement, applies paste to the side walls of the frame 20, Fig. 6 of the drawings. The moment the roll $8^4$ has been carried beyond and out of bearing contact with the arm 13', the roll 18 drops by gravity, restoring the arm 13' to normal position. As the said roll reaches its lowermost position—Fig. 7 of the drawings, the trunnions thereof engage with the slotted portions 25' of the cranks 24 and throw the same to force forwardly the slide 26' supporting the containers for the labels, so as to force the front label of each container against the pasted surfaces of the swinging label carrying frame 20. The parts remain in this position—Fig. 5 of the drawings, until an unlabeled bottle is conveyed toward said mechanism to have labels applied thereto, when the described action of said working parts is repeated. It will be understood that the upwardly projecting extensions of the swinging arm 30 bear against the labels for holding the same positioned to the surface of the bottle until carried well past the wiper fingers, or until the free end of the slide rod 32' is carried beyond the point $y$, of fixed cam 12', when the tension of the spring 31 restores the swinging arm 30 to normal position.

As the rolls $8^3$ and $8^4$ of the stem of the holder 4' with a labeled bottle supported thereon are carried beyond the sphere of the cam lever arms 13 and 13', the lower end of the stem 7' moves onto the short upwardly inclined segmental track 38, Figs. 1, 14 and 16 of the drawings, which gradually lifts the stem 7' to take the key $a$ thereof from within the key seat $a'$. During the travel of the stem over the inclined track 38, the projecting end of the slide plate 34' rides on the inclined portion of the fixed cam $34^a$, Figs. 1, 8 and 9 of the drawings, and is gradually forced inwardly, causing the dog 36 in engagement with one of the projecting pins or teeth 37 of the collar 37' to impart a one-quarter rotation thereto and the stem 7', while on the projecting end of the slide riding on the outwardly inclined section of the cam $34^a$, the tension of the spring 35 gradually forces outwardly the said slide, causing the opposing dog 36' in locked engagement with one of the pins or teeth 37 to move therewith for imparting a one-quarter turn or rotation to the collar 37' and the stem 7' of the holder 4', placing the key $a$ of the said stem 7' in registry with the seat $a^2$. A one-half rotation is thus imparted by the reciprocating slide plate 34' to the holder 4' and the bottle 5 supported thereon, so as to expose an unlabeled surface of the bottle to the labeling mechanism situated at the labeling station A'. As the stem 7' moves over the downwardly inclined portion of the track 38, the raised holder 4' is gradually lowered by the weight of the filled bottle thereon to place the key $a$ of the stem 7' within the key seat $a^2$. With the bottle thus positioned the same is conveyed toward the labeling mechanism situated at the station A' and as it is carried past the same the label is applied to the exposed surface thereof, the action of the working parts being the same as that described in connection with the labeling mechanism situated at station A.

The labeled bottle as conveyed toward the feed runway 6 is gradually removed from its holder by means of the deflecting wall 6', arranged within the path of the traveling holders a slight distance in advance of the feed runway 6. In case a bottle is not positioned within the runway to be removed by the holder carried past the same, the pressure of the springs 9 bearing against the under face thereof will, on the head 8' of the stem 7' being carried beyond the segmental track 8², force upwardly the holder 4' to raise the stem 7' thereof to place the rolls 8³ and 8⁴ above the plane of the cam levers or arms 13 and 13", so that as the holder 4' without a bottle thereon is carried past the labeling mechanism, the said levers 13 and 13' will not be thrown into action and the parts actuated thereby will remain in normal position; consequently, if a bottle is not presented to the labeling mechanism, the labeling mechanism will not be thrown into action.

The entire working of the apparatus so far as it relates to the applying of a label to the surface of a bottle is entirely automatic, and the movements of the parts are so arranged, relative to each other, that they successively come into action at the proper moment.

While in the present apparatus two labeling stations are employed for applying labels to opposing surfaces of a bottle, still such is not essential to the invention.

We are aware that changes may be made in the construction of the working parts herein shown and described without creating a departure from the invention, and we do not wish to be understood as confining or limiting ourselves to such construction of the working parts, nor do we wish to be understood as confining the use of the invention to the labeling of bottles, inasmuch as it may be utilized equally as well for the labeling of cans or vessels generally.

Having thus described the invention what is claimed as new and desired to be protected by Letters Patent is—

1. In an apparatus for labeling cylindrical or other shaped containers, the combination with a label holding receptacle, a conveyer for the container to be labeled, mechanism for imparting movement thereto, a laterally swinging frame for applying an adhesive to the foremost label exposed in said receptacle and for placing the coated label within the path of the propelled container, and devices for applying the label to the container.

2. In an apparatus for labeling cylindrical or other shaped containers, the combination with a label holding receptacle, a conveyer for the container to be labeled, mechanism for imparting movement thereto, a laterally swinging frame for applying an adhesive to the foremost label exposed in said receptacle and for placing the coated label within the path of the propelled container, and devices for wiping the label onto the moving container.

3. In an apparatus for labeling cylindrical or other shaped containers, the combination with a label holding receptacle, a conveyer for the container to be labeled, mechanism for imparting movement thereto, a laterally swinging frame for applying an adhesive to the foremost label exposed in said receptacle and for placing the coated label within the path of the propelled container, and devices carried by the laterally swinging frame for wiping the label onto the moving container.

4. In an apparatus for labeling cylindrical or other shaped containers, the combination with a label holding receptacle, a conveyer for the container to be labeled, mechanism for imparting movement thereto, a laterally swinging frame, reciprocating means for applying an adhesive to said frame, means for swinging said frame into contact with the foremost label exposed in said receptacle, means for swinging the frame carrying the coated label across the path of the propelled container, and devices for wiping the label onto the propelled container.

5. In an apparatus for labeling cylindrical or other shaped containers, the combination with a conveyer for the container to be labeled, mechanism for imparting movement thereto, label holding receptacles, means for applying an adhesive to the foremost label exposed in said receptacles and for placing the coated labels in the path of the propelled containers, said means being operatable by the weight of the propelled container; and devices for applying the labels to the container.

6. In an apparatus for labeling cylindrical or other shaped containers, the combination with a conveyer for the container to be labeled, a laterally swinging frame for placing the label in the path of the container, and devices carried by the laterally swinging frame and through which the container is carried for wiping the label onto the container.

7. In an apparatus for labeling cylindrical or other shaped containers, the combination with a conveyer for the containers to be labeled, and a swinging frame operatable by the propelled container for placing the label in the path of the container.

8. In an apparatus for labeling cylindrical or other shaped containers, the combination with a conveyer for the containers to be labeled, and a swinging frame operatable by the weight of the propelled container for positioning the label within the path of the container.

9. In an apparatus for labeling cylindrical or other shaped containers, the combination with a conveyer for the containers to be labeled, spaced container carriers on said conveyer, and a swinging frame operatable by the weight of the container when in said carrier for positioning the label in the path of the container.

10. In an apparatus for labeling cylindrical or other shaped containers, the combination with a continuously operated conveyer table, spaced container carriers on said conveyer table, means for positioning the label in the path of the container, said means being operatable by contact with the container carriers, and devices for wiping the label onto the container.

11. In an apparatus for labeling cylindrical or other shaped containers, the combination with a rotating conveyer table for the containers to be labeled, a swinging label picker, a label receptacle in the path of movement of said label picker, means for applying an adhesive to the label picker in its movement toward the label receptacle, means for forcing the adhesively coated label picker into contact with the exposed face of the foremost label in the label receptacle and removing the label therefrom, and means for positioning the label in the path of the propelled container.

12. In an apparatus for labeling cylindrical or other shaped containers, the combination with a rotatable table for the containers to be labeled, mechanism for imparting movement thereto, a label holding receptacle, means operatable by the weight of the container for applying an adhesive to the foremost label exposed in said receptacle and for placing the same in the path of said propelled container, and devices for wiping the label onto the container.

13. In an apparatus for labeling cylindrical or other shaped containers, the combination with a label holding receptacle, a rotating table for conveying the containers to be labeled, spaced container carriers positioned on said table, a swinging frame for applying an adhesive to the foremost label exposed in said receptacle and for placing the coated label within the path of the container, and devices carried by the swinging frame for wiping the label onto the moving container.

14. In an apparatus for labeling cylindrical or other shaped containers, the combination with a rotating table for conveying the containers to be labeled, of a laterally swinging frame for placing an adhesively coated label within the path of the propelled container, and wipers carried by said laterally swinging frame and movable into the path of the container and through which the container and the label are carried.

15. In an apparatus for labeling cylindrical or other shaped containers, the combination with a continuously rotated conveyer table, spaced container carriers on said table, label receptacles, means for applying an adhesive to the foremost label exposed in said receptacles, and for removing the adhesively coated label from its receptacle and placing it in the path of the moving container, means for holding the label to the surface of the moving container while being applied thereto, and flexible wipers movable into the path of the container and through which the container and the label pass for smoothing out the label and pressing the same to the surface of the container.

In testimony whereof we have signed our names to this specification in the presence of two subscribing witnesses.

GEORGE LEE BENDER.
JOHN GEORGE RAPP.

Witnesses:
H. BESHARMAN,
Geo. W. Brooks.